Nov. 13, 1951  H. J. EISENHAUER, SR  2,575,263
ANTISKID DEVICE

Filed March 14, 1950  3 Sheets-Sheet 1

INVENTOR.
Harry J. Eisenhauer, Sr.
BY Bean, Brooks, Buckley & Bean
ATTORNEYS.

Nov. 13, 1951  H. J. EISENHAUER, SR  2,575,263
ANTISKID DEVICE

Filed March 14, 1950  3 Sheets-Sheet 2

INVENTOR.
Harry J. Eisenhauer, Sr.
BY Bean, Brooks, Buckley & Bean
ATTORNEYS.

Patented Nov. 13, 1951

2,575,263

UNITED STATES PATENT OFFICE 2,575,263

ANTISKID DEVICE

Harry J. Eisenhauer, Sr., Buffalo, N. Y.

Application March 14, 1950, Serial No. 149,627

11 Claims. (Cl. 152—225)

My invention relates in general to anti-skid devices, and particularly to such devices as are applicable to tires of motor vehicles.

One of the principal objects of my invention is to provide an anti-skid device which may be conveniently and quickly applied to a vehicle tire.

Another object is to provide relatively rotating discs whereby the tire-engaging arms may be drawn toward the tire, means being provided to lock the discs when the tire-engaging members have been moved to their final adjusted positions.

A further object is to provide a locking disc and a cam disc with clutch means therebetween for coupling the two discs when the tire-engaging arms are adjusted.

Moreover, my device is provided with convenient means for locking the clutch in its adjusted position whereby it will not become disengaged when in use by jarring or the like.

Furthermore, means are provided on one of the discs whereby when the cam disc is rotated the tire-engaging arms will be prevented from rotating therewith.

Another object is to provide a device which is easily collapsible having detachable tire-engaging arms, whereby it may be stored in compact manner.

Furthermore, my device is of such nature that one disc assembly may be used with various size tire-engaging arms, thereby adapting the device to various size tires.

The above objects and advantages have been accomplished by the device shown in the accompanying drawing, of which:

Figure 1:
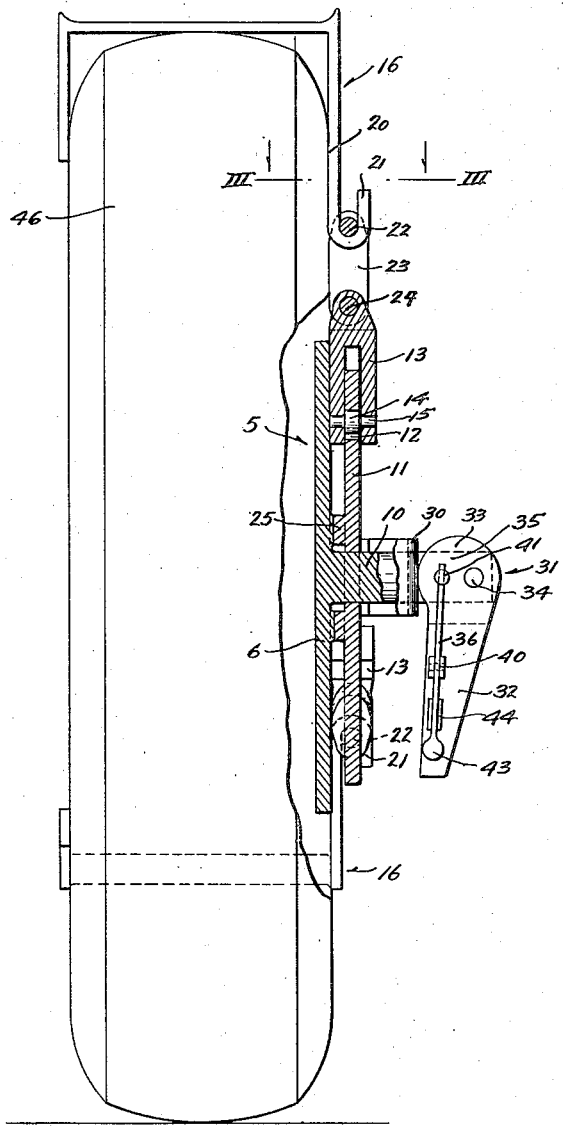
Fig. 1 is a side elevation of my device, partly in section showing it applied to a vehicle tire.

My device comprises a body 5 having a locking disc 6 circular in form and provided with a projecting locking stud 10 arranged centrally of the disc and having its axis perpendicular therto. Rotatably mounted upon the locking stud of the locking disc is a cam disc 11. The cam disc is provided with a number of slots 12, equidistantly spaced about the disc and arranged in eccentric formation around the center of the stud. A plurality of clevises 13 are provided and each is formed with two spaced legs which straddle the cam disc, one leg of each clevis being disposed in the space between the discs. Each of these clevises is formed with a pivotally mounted roller 14. Each of the rollers 14 is mounted upon a roller pivot 15 carried by the legs of the clevis. Each roller is engageable with the corresponding groove 12 of the cam disc and serves to actuate the clevis radially when the cam disc 11 is rotated relatively to the locking disc 6, as will hereinafter appear.

A plurality of tire-engaging arms 16 are provided for my device, each having a radial portion 20 which is formed at its inner end with a hook 21. This hook engages a link pin 22 carried by a pair of links 23. These links are joined at their bottom ends by a clevis pin 24 which passes through the upper end of the clevis 13. These links serve to connect the clevis with the tire-engaging arm as will be clear from Fig. 1.

Figure 4:
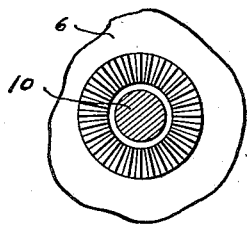
Fig. 4 is a fragmentary view of one of the locking discs showing a portion of the clutch means.
Figure 3:
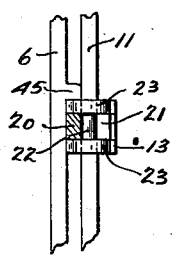
Fig. 3 is a fragmentary sectional view taken on line III—III of Fig. 1.

The cam disc 11 is formed near its central portion with a clutch ring 25 which is formed on its surface with grooves or serrations and which engages companion grooves or serrations formed in the adjacent surface of the locking disc 6, as clearly shown in Fig. 4. These serrations when engaged serve to lock the locking disc and cam disc together to prevent relative rotation thereof. The parts of this clutch are so proportioned that when engaged, the leg of the clevis 13 which lies between the locking disc and cam disc may be securely clamped or locked in position, thereby preventing movement of the clevises and the tire-engaging arms.

A handle 30 is provided on the cam disc 11 and is arranged preferably across the center thereof and is provided with an aperture through which the locking stud 10 may be passed. This handle provides means for rotating the cam disc relative to the locking disc when the tire-engaging arms are being clamped upon the tire. Means must also be provided for holding or relatively rotating the stud and locking disc. Such means are provided in the clutch clamping means 31. This clamping means comprises a clamp arm 32 which is pivotally attached to the outer extending end of the locking stud 10 and which is provided with two arms 33 which straddle the stud, a pivot pin 34 being passed through the stud and the arms. The clamp arm is formed at its inner pivoted end with an eccentric portion 35 which when rotated to the position shown in Fig. 1 will bear against the handle 30 and cause the clutch formed by the serrations on the clutch ring and engaging locking disc to be engaged and to thereby not only prevent further rotation of the locking disc with the clamping disc, but also firmly clamp the clevises in fixed operative positions. So as to maintain the clamp arm 32 in its locked position, I preferably provide a latch 36 which is pivotally attached to a lug 40 carried by the arm and extends radially toward the center of the device where it is preferably passed through or pivotally attached to a clutch lock pin 41. This pin is carried by one of the arms 33 of the clamping lever and it engages an aperture 42 formed in the locking stud 10. The latch extends outwardly terminating in a finger piece 43 at its outer end. A spring 44 is provided for holding the lock pin in its engaged position, as shown in Fig. 2.

The locking disc 6 is preferably slightly larger in diameter than the cam disc 11 and from its adjacent face a number of detent lugs 45 extend which engage the side of the clevises when the parts are relatively rotated to their tire-engaging positions, thereby holding the clevises in position against the locking disc while the cam disc is being rotated to draw the tire-engaging members in contact with the tire.

When my device is to be put into use, one of the tire-engaging arms 16 is placed over the top of the tire, represented by the numeral 46 and one of the link pins is engaged with the hook 21 of the arm just engaged with the tire, this will serve to suspend the body part of the device while the other tire-engaging arms are engaged at spaced intervals with the periphery of the tire. When the links have been engaged with the respective hooks of the tire-engaging arms, the operator grasps the handle 30 and while holding the clamp arm, which is obviously in an unlatched position or which has been rotated to substantially 180° counterclockwise as viewed in Fig. 1, and which is used as a handle to prevent rotation of the locking disc 6, the cam disc 11 is rotated in counterclockwise direction as viewed in Fig. 2 which will cause the rollers engaging the slots 20 to draw the clevises radially toward the center of the tire. This will cause the tire-engaging arms to be tightly drawn into contact with the periphery of the tire. When the two discs have been rotated sufficiently to bring about the proper contact of the tire-engaging arms, the clamp arm 32 is rotated in clockwise direction to bring it to the position shown in Fig. 1. During its movement, the eccentric 35 will bear upon the handle 30 and cause the clutch elements to be brought into engagement with each other. It is obvious that when the clamp arm is in the inactive position, the clamping and locking discs will be separated sufficiently so as to allow free movement of the clevises and rotating movement of the discs. When the clamp arm has been moved to the locking position shown in Fig. 1, the clutch elements will be locked in position. When moved to the position shown in Fig. 2, the clamp arm itself will be locked in such position by means of the clutch lock pin 41 which will be forced into engagement with the recess 42 by means of the spring 44. It will be obvious that when the parts are locked as just described, the tire-engaging arms will be fixed in position and prevented from becoming detached from the tire.

Figure 5:
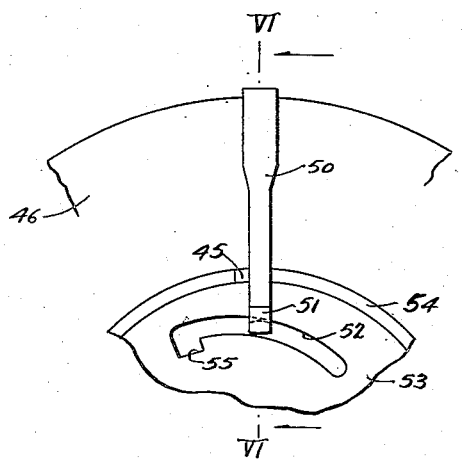
Fig. 5 is a fragmentary front elevation of a modified form of my invention.
Figure 6:
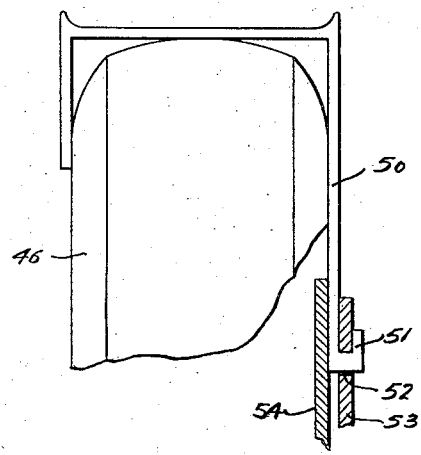
Fig. 6 is a fragmentary side sectional elevation thereof and taken on line VI—VI of Fig. 5.

In the form of invention shown in Figs. 5 and 6, each of the tire-engaging arms 50 is formed with a hook 51 at its lower end which is directly engageable with an eccentrically shaped slot 52 formed in the cam disc 53. As shown in Fig. 6, the inner portion of each tire-engaging arm is disposed between the locking disc 54 and the cam disc 53 and is locked therebetween by any suitable clamping means, such as that shown in Figs. 1 and 2. In order to be able to assemble the tire-engaging arms with the cam disc 53, each of the slots 52 is formed with a recess 55 of a width which will permit the initial engagement of the hook 51 with the slot.

Figure 2:
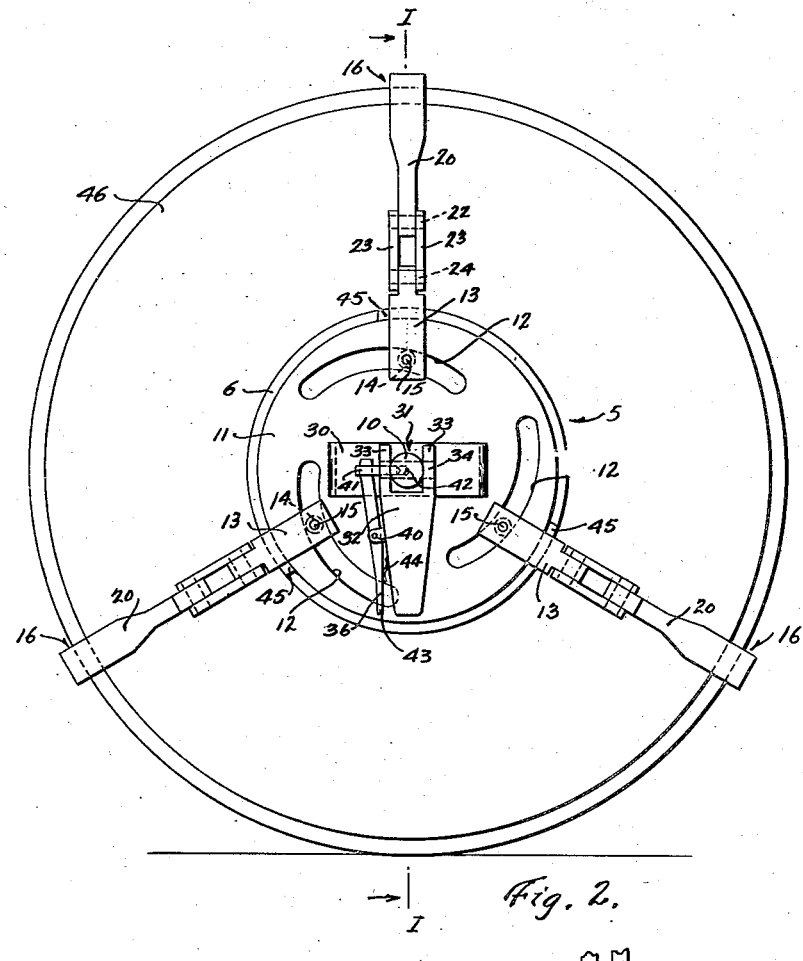
Fig. 2 is a face view of the device as applied to a tire.
Figure 7:
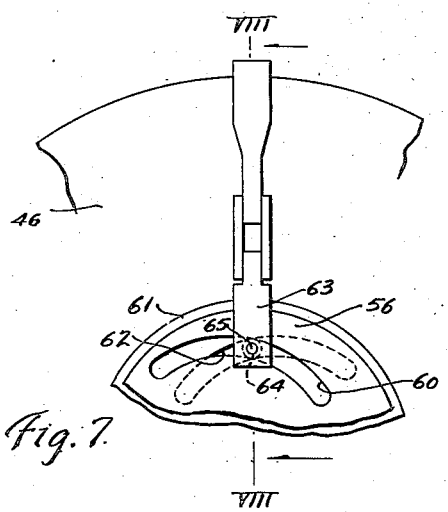
Fig. 7 is a fragmentary front elevation of another modified form of the invention; and, Fig. 8 is a sectional view thereof taken on line VIII—VIII of Fig. 7.
Figure 8:
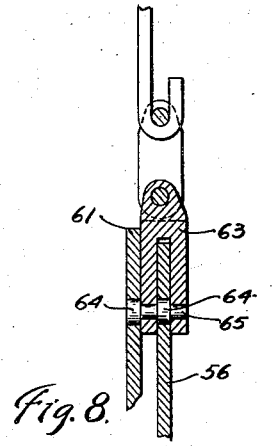

In the form of invention shown in Figs. 7 and 8, the cam disc 56 is formed with eccentric slots 60 similar to the disc of the form of Figs. 1 and 2. In addition to this, however, the locking disc 61 is also formed with eccentrically arranged slots 62 which are inclined in the opposite hand direction as shown in Fig. 7, whereby when the discs are relatively rotated the open space between them will travel inwardly or outwardly in radial direction. In this form of invention, a clevis 63 is preferably employed, one leg of which being arranged in the space between the locking and cam discs 56 and 61. Rollers 64 are disposed in each of these slots and a pin 65 serves to connect the rollers and to pivotally mount them within the clevis 63. As in the other modified form, the clamping means for locking both discs together may be any suitable type such as that shown in Figs. 1 and 2.

While I have shown and described the clevises as being locked or clamped between the locking and cam discs, it may be that under certain working conditions it will be advisable to permit pivotal movement of the clevises about the roller, and in such cases, the space between the locking and cam discs is somewhat greater than the thickness of that portion of the clevis which engages it. In such a modification, the clutch formed between the discs will serve to clamp the discs together and to prevent relative movement of them after the tire-engaging arms have been adjusted to tire-engaging positions. Moreover, specific changes may be made in type of clevis and clutch locking means without departing from the spirit of my invention or the scope of the appended claims, and I do not, therefore, wish to be limited to the exact embodiment herein shown and described.

What I claim is:

1. An antiskid device comprising a locking disc having a centrally arranged locking stud, a cam disc rotatably mounted upon said locking stud, a plurality of tire-engaging members, a plurality of clevises mounted upon said cam disc and connected to said tire-engaging members, means carried by said cam disc and engageable with said clevises for causing radial movement of the latter upon relative rotative movement of said discs, and means for locking said discs in adjusted positions.

2. An antiskid device comprising a locking disc having a centrally arranged locking stud, a cam disc rotatably mounted upon said locking stud, a plurality of separate tire-engaging members, a plurality of clevises mounted upon said cam disc and detachably connected to said tire-engaging members, means carried by said cam disc and engageable with said clevises for causing radial movement of the latter upon relative rotative movement of said discs, and means for locking said discs in adjusted positions.

3. An antiskid device comprising a locking disc having a centrally arranged locking stud, a cam disc rotatably mounted upon said locking stud, a plurality of separate tire-engaging members, a plurality of clevises mounted upon said cam disc and detachably connected to said tire-engaging members, said cam disc being formed with a plurality of spaced eccentrically arranged slots for cooperative engagement with said clevises, and means carried by said stud for retaining said discs against relative rotation.

4. An antiskid device comprising a locking disc, a cam disc rotatable relatively with said locking disc, a plurality of tire-engaging members, a plurality of clevises mounted upon said cam disc and detachably connected to said tire-engaging members, each of said clevises having one of its legs disposed between said discs, cam-shaped means for causing radial movement of said clevises through relative rotative movement of said discs, and means for moving said discs axially toward each other to lock the same in adjusted positions.

5. An antiskid device comprising a locking disc, a cam disc rotatable relatively with said locking disc, a plurality of tire-engaging members each having its inner ends disposed between said discs and each being formed thereat with an outwardly projecting hook, detent means carried by said locking disc for engagement with said tire-engaging members, a plurality of eccentrically arranged slots formed in said cam disc each for engagement with the hook of one of said tire-engaging members, and means for locking said discs in adjusted positions.

6. An antiskid device comprising a locking disc, a cam disc rotatable relatively with said locking disc, said cam disc being formed with a plurality of eccentrically arranged slots, a plurality of tire-engaging members, means carried by said members for engagement with the slots of said cam disc, clutch means carried by said discs for coupling the same upon axial movement toward each other, and means for moving said discs to coupling positions and locking the same in such positions.

7. An antiskid device comprising a locking disc, a cam disc rotatable relatively with said locking disc, said cam disc being formed with a plurality of eccentrically arranged slots, a plurality of tire-engaging members, means carried by said members for engagement with the slots of said cam disc, and handle means carried by each of said discs to permit the same to be rotated relatively, said handle means carried by said locking disc being formed with a cam-shaped abutment engageable with the handle means on the cam disc to hold said discs in coupled positions.

8. An antiskid device comprising a locking disc having a centrally arranged locking stud, a cam disc rotatably mounted upon said locking stud and formed with a plurality of eccentrically arranged slots, a plurality of tire-engaging members, means carried by said members for engagement with the slots of said cam disc, clutch means carried by said discs for coupling the same upon relative axial movement toward each other, a clamp arm carried by said stud for holding said clutch means in coupled position, and latch means carried by said clamp arm and engageable with said stud for locking the former in clamping position.

9. An antiskid device comprising a locking disc having a centrally arranged locking stud, a cam disc rotatably mounted upon said locking stud and formed with a plurality of eccentrically arranged slots, a plurality of tire-engaging members, means carried by said members for engagement with the slots of said cam disc, clutch means carried by said discs for coupling the same upon relative axial movement toward each other, a clamp arm carried by said stud for holding said clutch means in coupled position, and a handle carried by said cam disc for cooperation with said clamp arm when in inactive position to permit relative rotation of said discs.

10. An antiskid device comprising a locking disc, a cam disc rotatable relatively with said locking disc, a plurality of tire-engaging members each having its inner end disposed between said discs and each being formed thereat with an abutment, a plurality of eccentrically arranged slots formed in each of said discs, the slots of said discs being in opposite hand arrangement and each two companion slots being engaged by the abutment of one of said tire-engaging members, and means for locking said discs in adjusted positions.

11. An antiskid device comprising a locking disc, a cam disc rotatable relatively with said locking disc, a plurality of tire-engaging members each having its inner end disposed between said discs and each being formed thereat with an abutment, a plurality of eccentrically arranged slots formed in each of said discs, the slots of said discs being in opposite hand arrangement and each two companion slots being engaged by the abutment of one of said tire-engaging members, clutch means for coupling said discs upon relative axial movement toward each other, and clamp means carried by said discs for clamping them together.

HARRY J. EISENHAUER, Sr.

REFERENCES CITED

The following references are of record in the file of this patent:

UNITED STATES PATENTS

| Number | Name | Date |
|---|---|---|
| 2,188,120 | Smith | Jan. 23, 1940 |
| 2,527,939 | Krider | Oct. 31, 1950 |